US008804142B2

(12) United States Patent
Zancanaro et al.

(10) Patent No.: US 8,804,142 B2

(45) Date of Patent: Aug. 12, 2014

(54) METHOD, DEVICE, AND COMPUTER-READABLE MEDIUM FOR DETERMINING AND IMPLEMENTING CHANGES IN THE MACHINE SETTINGS OF A PRINT PROCESSING MACHINE

(75) Inventors: Giorgio Zancanaro, Oensingen (CH); Bruno Luetolf, Uerkheim (CH); Christoph Mueller, Vordemwald (CH)

(73) Assignee: Mueller Martini Holding AG, Hergiswil (CH)

( * ) Notice: Subject to any disclaimer, the term of this patent is extended or adjusted under 35 U.S.C. 154(b) by 250 days.

(21) Appl. No.: 13/435,859

(22) Filed: Mar. 30, 2012

(65) Prior Publication Data

US 2012/0250049 A1 Oct. 4, 2012

(30) Foreign Application Priority Data

Mar. 30, 2011 (CH) ...................................... 0588/11

(51) Int. Cl.
*G06K 15/00* (2006.01)
*G06F 3/12* (2006.01)

(52) U.S. Cl.
USPC ......................... 358/1.12; 358/1.15; 358/1.14

(58) Field of Classification Search
None
See application file for complete search history.

(56) References Cited

U.S. PATENT DOCUMENTS 5,083,281 A * 1/1992 Rabindran et al. ............ 700/220
8,210,806 B2 * 7/2012 Yang et al. .................... 415/204
2004/0073330 A1 4/2004 Bader et al.

FOREIGN PATENT DOCUMENTS

EP 2279974 A1 2/2011

OTHER PUBLICATIONS

International Search Report issued for Swiss Patent Application No. 00588/11 filed Mar. 30, 2011.

* cited by examiner

*Primary Examiner* — Marcus T Riley

(74) *Attorney, Agent, or Firm* — Venable LLP; Robert Kinberg; Todd R. Farnsworth

(57) ABSTRACT

A method, a device, and a computer readable medium may be provided for operating a print processing machine. The print processing machine may have a gross capacity (BP), a net capacity (NP), and/or a number (N) of devices in communication with the print processing machine. The net capacity (NP) may be computed as a function of the gross capacity (BP), the number (N) of devices, a stop rate (SR), a time interval for each stop (TN) and an error rate (FR) according to $NP=[1-(BP\cdot SR\cdot N\cdot TN)]\cdot BP-(BP\cdot FR\cdot N)$. Limit values for errors contained in the stop rate (SR) and/or the error rate (FR) may be received. A maximum value may be determined for the net capacity (NP) by varying the gross capacity (BP) and/or the number (N) of devices without exceeding the limit values. The gross capacity (BP) of the print processing machine and the number (N) of devices may be adjusted to achieve the previously determined maximum value for the net capacity (NP).

18 Claims, 4 Drawing Sheets

| BP | N=18 | N=19 | N=20 | N=21 |
|---|---|---|---|---|
| 18000 | 11592 | 11286 | 10980 | 10674 |
| 17000 | 11203 | 10928 | 10653 | 10379 |
| 16000 | 10784 | 10539 | 10293 | 10048 |
| 15000 | 10335 | 10118 | 9900 | 9683 |
| 14000 | 9856 | 9665 | 9473 | 9282 |
| 13000 | 9347 | 9180 | 9013 | 8847 |
| 12000 | 8808 | 8664 | 8520 | 8376 |
| 11000 | 8239 | 8116 | 7993 | 7871 |
| 10000 | 7640 | 7537 | 7433 | 7330 |
| 9000 | 7011 | 6926 | 6840 | 6755 |
| 8000 | 6352 | 6283 | 6213 | 6144 |

FIG. 2

METHOD, DEVICE, AND COMPUTER-READABLE MEDIUM FOR DETERMINING AND IMPLEMENTING CHANGES IN THE MACHINE SETTINGS OF A PRINT PROCESSING MACHINE

CROSS-REFERENCE TO RELATED APPLICATION

This application claims the priority of the Swiss Patent Application No. 00588/11, filed on Mar. 30, 2011, the subject matter and contents of which is incorporated herein by reference in its entirety.

BACKGROUND OF THE INVENTION

The present invention relates to a method and a device for determining and implementing changes in the settings of a machine for print processing.

For the downstream processing of printed material, the control and optimizing of production steps and machine settings for the print processing machine play an important role in view of ensuring an economic production. A well thought-out method for determining and implementing changes in the machine settings consequently represents an important element for lowering the costs, for example through a quick adaptation of the print processing machine to different production parameters such as the complexity and format of the printed product. Known print processing machines generally include gathering and wire-stitching machines, inserters, collating machines, perfect binders, book-binding machines or machines for the digital book production.

U.S. Pat. No. 5,083,281 A discloses an inserter for which the speed is optimized. The inserter comprises a speed-optimizing circuit which increases the throughput of successfully inserted document sets. In the process, an actual throughput is measured and the result is then supplied to a microcontroller which predicts an expected throughput on the basis of the previously measured values, taking into consideration a weighting of the most recent prediction. Depending on the result, the microcontroller then triggers a servo-mechanism for changing the speed of the inserter. This system has the disadvantage that the prediction is not precise, owing to the complexity of the machine and the plurality of factors that influence the speed. At best, it represents a more or less accurate guideline.

SUMMARY OF THE INVENTION

It is an object of the present invention to provide an improved method, device, and computer program product for determining and implementing changes in the machine settings of further print processing machines, so as to achieve a cost-effective production of printed products.

The above and other objects may be achieved according to the invention wherein according to an embodiment there is provided a method for operating a print processing machine having a gross capacity (BP), a net capacity (NP), and a number (N) of devices in communication with the print processing machine, wherein the number (N) of devices restrict the gross capacity (BP) of the print processing machine, which in one embodiment, the method comprising: computing the net capacity (NP) by a processing module, wherein the net capacity (NP) is computed as a function of the gross capacity (BP), the number (N) of devices, a stop rate (SR), a time interval for each stop (TN) and an error rate (FR) according to the following formula: $NP=[1-(BP\cdot SR\cdot N\cdot TN)]\cdot BP-(BP\cdot FR\cdot N)$, wherein the stop rate (SR) and the error rate (FR) depend at least partially on the number (N) of devices or the gross capacity (BP) of the print processing machine; receiving, by the processing module, limit values for errors contained in at least one of the stop rate (SR) or the error rate (FR); determining a maximum value for the net capacity (NP) by the processing module, the maximum value for the net capacity (NP) determined by varying the gross capacity (BP) or the number (N) of devices without exceeding the limit values; deriving a maximum gross capacity and maximum number of devices that correspond to the determined maximum value for the net capacity (NP); determining, by the processing module, changes to the gross capacity (BP) or the number (N) of devices by comparing the maximum gross capacity and maximum number of devices to a current work order; and adjusting the gross capacity (BP) of or the number (N) of devices according to the determined changes.

According to another embodiment the invention, there is provided an apparatus for determining and implementing changes in machine settings of a print processing machine operating with a gross capacity (BP), a net capacity (NP), and a number (N) of print devices for further processing of printed products, wherein the number (N) of devices restrict the gross capacity (BP) of the print processing machine, the apparatus comprising: a communications interface in communication with a main control unit, wherein the main control unit communicates with the print processing machine and with the devices for further processing of printed products; a data processing module in communication with the communications interface, the data processing module operable to perform the following: compute the net capacity (NP) as a function of the gross capacity (BP), the number (N) of devices, a stop rate (SR), a time interval for each stop (TN) and an error rate (FR) according to the following formula: $NP=[1-(BP\cdot SR\cdot N\cdot TN)]\cdot BP-(BP\cdot FR\cdot N)$, wherein the stop rate (SR) and the error rate (FR) depend on the number (N) of devices or the gross capacity (BP); receive limit values for errors contained in the stop rate (SR), the error rate (FR), or both the stop rate (SR) and the error rate (FR); determine a maximum value for the net capacity (NP) by varying the gross capacity (BP) or the number (N) of devices without exceeding the limit values; derive a maximum gross capacity and maximum number of devices that correspond to the determined maximum value for the net capacity (NP); determine changes to the gross capacity (BP) or the number (N) of devices by comparing the maximum gross capacity and maximum number of devices to a current work order; and wherein the main control unit adjusts the gross capacity (BP) of the print processing machine or the number (N) of devices according to the determined changes.

According to another embodiment, there exists a non-transitory computer-readable medium comprising instructions, which when executed by a processor causes the processor to perform operations for operating a print processing machine having a gross capacity (BP), a net capacity (NP), and a number (N) of devices in communication with the print processing machine, wherein the number (N) of devices restrict the gross capacity (BP) of the print processing machine, the computer-readable medium comprising instructions for: computing the net capacity (NP) as a function of the gross capacity (BP), the number (N) of devices, a stop rate (SR), a time interval for each stop (TN) and an error rate (FR) according to the following formula: $NP=[1-(BP\cdot SR\cdot N\cdot TN)]\cdot BP-(BP\cdot FR\cdot N)$, wherein the stop rate (SR) and the error rate (FR) depend at least partially on the number (N) of devices or the gross capacity (BP); receiving limit values for errors contained in the stop rate (SR), the error rate (FR), or both the stop rate (SR) and the error rate (FR); determining a maximum value for the net capacity (NP) by varying the gross capacity (BP) or the number (N) of devices without exceeding the limit values; deriving a maximum gross capacity and maximum number of devices that correspond to the determined maximum value for the net capacity (NP); and determining changes to the gross capacity (BP) or the number (N) of devices by comparing the maximum gross capacity and maximum number of devices to a current work order.

In another embodiment, a print processing machine may be operated with a gross capacity for producing printed products. For this, the print processing machine may be provided with several different types of devices for the subsequent processing of printed products, of which at least one type limits the gross capacity of the print processing machine because, for example, of the number of mechanisms it contains. With the aid of the method according to the invention and actual values from the processing of an actual work order and/or of preceding work orders, the number of devices limiting the gross capacity of the print processing machine and/or the gross capacity of the print processing machine may be changed, wherein these changes may be determined with the following steps.

In a first step, a net capacity may be computed as a function of the gross capacity, the number of devices which restrict the gross capacity of the print processing machine, a stop rate, a time for each stop, and an error rate, relative to a reference interval, wherein the following formula is used for the computation:

$$NP=[1-(BP\cdot SR\cdot N\cdot TN)]\cdot BP-(BP\cdot FR\cdot N) \quad (1)$$

NP in this case stands for the net capacity, BP for the gross capacity, N for a number of devices that restrict the gross capacity of the further print processing machine, SR for the stop rate, TN for the time per stop, and FR for the error or failure rate. The stop rate and the error rate may depend at least partially on the number of devices that restrict the gross capacity of the print processing machine and/or the gross capacity, thereby resulting in a reduction of the net capacity.

Limit values for at least some of the errors contained in the stop rate and/or in the error rate may be specified in a second step.

In a third step, a maximum value for the net capacity may be determined by varying the gross capacity and/or the number of devices restricting the gross capacity of the machine for the processing of print material, with the condition that the limit values are not exceeded.

By comparing the gross capacity, which corresponds to the determined maximum value for the net capacity and/or the number of devices for restricting the gross capacity of the print processing machine, with the actual values obtained during the processing of the current work order, the changes may then be determined during a fourth step.

In another embodiment, a device according to the invention may comprise means for realizing the method according to the invention. The device may be connected to a main control unit of the print processing machine and may be integrated into the main control unit for the print processing machine. The means for realizing the method may comprise a data acquisition module, a data processing module, a communication interface and/or a user interface.

In another embodiment, the device according to the invention may be used in a print processing machine which, according to one inventive embodiment, may be a gathering and wire-stitching machine provided with sheet feeders.

In another embodiment, the method according to the invention may be used for analyzing a configuration of the print processing machine and for optimizing this configuration in dependence on an achievable net capacity and operating data acquired during the processing of previous work orders.

The method may also be used for predicting an achievable net capacity for a print processing machine depending on the print processing machine configuration and operating data that was acquired during the processing of previous work orders.

In yet another embodiment, the method and the device for realizing the method make it possible to improve the production of printed products by incorporating a plurality of machine-related and personnel-related parameters, wherein this may lead to a more cost-effective processing of the work orders as well as differentiated optimization results for a plurality of configurations.

In yet another embodiment, the standstill time TA for each time unit may also be included into the computation of the net capacity, wherein the following formula may be used:

$$NP=[1-(BP\cdot SR\cdot N\cdot TN)-TA]\cdot BP-(BP\cdot FR\cdot N) \quad (2)$$

BRIEF DESCRIPTION OF THE DRAWINGS

Selected embodiments of the invention follow from the dependent claims and are explained in further detail in the following description with the aid of the examples described therein and the Figs., showing in:

FIG. 2: An example of a list containing the net capacities in dependence on the gross capacities and a number of devices which restrict the gross capacity of the print processing machine;

DETAILED DESCRIPTION

Figure 1:
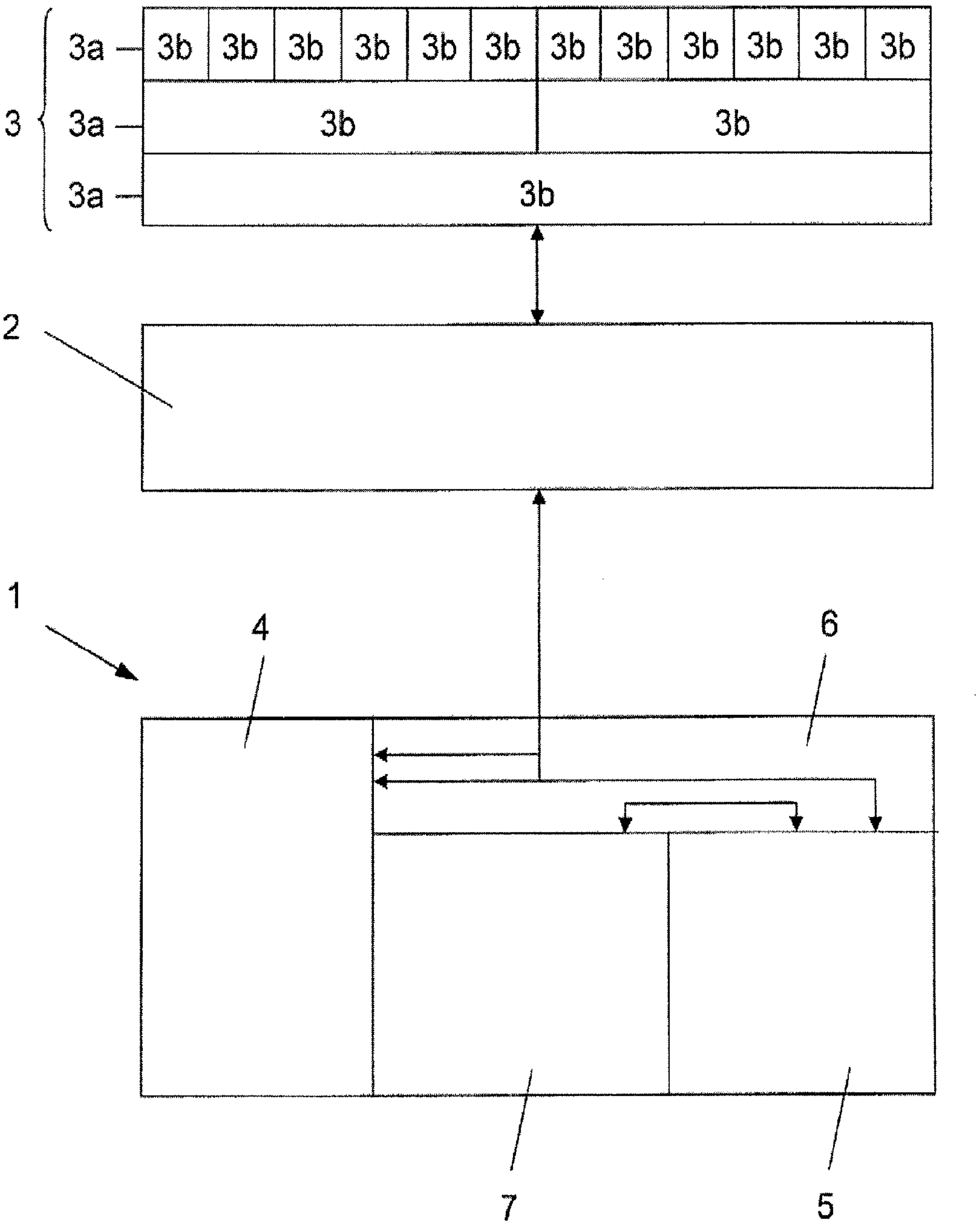
FIG. 1: A schematic view of an embodiment of the invention.

Shown in FIG. 1 is a schematic view of a preferred embodiment of a device 1 which may be connected to a main control unit 2 which may be connected to a print processing machine 3. Print processing machine 3 may be, for example, embodied as gathering and wire-stitching machine. A gathering and wire-stitching machine of this type, not shown in further detail herein, is generally known and may be provided with several devices. These provided devices may include, for example, a circulating gathering chain comprising a number N of sheet feeders emptying into it, a stitching device, as well as a cutting or trimming device. For example, sheet feeders may represent a type 3*a* of devices 3*b* of print processing machine 3. The gross capacity BP of print processing machine 3 may be restricted as a result of the number N of sheet feeders, for example. The number N of other types 3*a* of devices 3*b* may also function to restrict the gross capacity of print processing machine 3. For example, sample gluers or the cover feeders may also function to restrict the gross capacity of print processing machine 3.

Individual sheets may be deposited straddling on the support elements of the gathering chain with the aid of the sheet feeders. For example, several printed sheets may be gathered one above the other in a sequence required for the production of a printed product. The printed sheets may then be stitched together and correspondingly trimmed to match the format specified for the printed product.

Device 1 may comprise a data acquisition module 4, a data processing module 5, a communication interface 6, and a user interface 7. Data acquisition module 4 may record and store at least one configuration and one net capacity NP of print processing machine 3. The data acquisition module 4 additionally may acquire a value for the number of stops in particular during the processing of each work order. Data acquisition module 4 may detect how often print processing machine 3 has stopped during the processing of a work order. Also detected may be the error source responsible for each stop (e.g. the corresponding sheet feeder). Data processing module 5 may contrast the configuration and the net capacity NP of print processing machine 3 during the processing of several work orders, as well as for characterizing an optimum configuration in dependence on a specified limit value for at least a portion of the errors contained in a stop rate SR and/or in an error rate FR, for example. Communication interface 6 of device 1 may be responsible for the internal and/or external data communication. For example, data acquisition module 4 may communicate with main control unit 2 which, in turn, may control print processing machine 3.

According to one embodiment, data acquisition module 4 may instruct main control unit 2 to acquire measuring data. Measuring data may include, for example, a current gross capacity BP of print processing machine 3. The measured data may be transmitted by data acquisition module 4 via communication interface 6 to data processing module 5 for processing. Data processing module 5 may communicate with user interface 7, so as to provide, for example, the resulting values such as the current net capacity NP or the anticipated work order completion. Data processing module 5 may also function to receive commands from a user. These user commands may specify, for example, an increase in the gross capacity BP of print processing machine 3, which may then be transmitted to main control unit 2 via communication interface 6. User interface 7 furthermore may comprise means for visualizing predetermined and/or measured values. For example, the net capacities NP and/or the errors can be plotted over a time axis. In addition or as an alternative, user interface 7 may also show whether a targeted net capacity can be reached with the current machine settings. Furthermore, an expected value for the length of time it will take to process a work order with the current configuration may be determined by data processing module 5 and displayed to a user via user interface 7.

According to one embodiment, the net capacity NP may be computed separately for several work shifts. Accordingly, the net capacity NP can also be displayed separately for each work shift. The term work shift in this case is understood to refer to the work time or shift assigned to one or several operators. In this connection, the net capacity NP may be computed with the aforementioned parameters according to the following formula, $$NP=[1-(BP\cdot SR\cdot N\cdot TN)]\cdot BP-(BP\cdot FR\cdot N) \quad (1)$$

The above formula may also relate to each work shift. For example, a reaction time for the machine operator, required for resuming the operation of print processing machine 3 in the wake of a machine stop, can also enter into the stop interval. The computing and the display of the net capacity for each work shift may be especially advantageous for taking into account the operating factors during the determination of the net capacity NP. For example, operating errors may be identified as one cause for not reaching the desired net capacities with an otherwise error-free operation of print processing machine 3. Individual break times for the operating personnel may also be taken into account. As a result, it may be possible to achieve a high flexibility with respect to the planning for the processing of work orders and an accurate prognosis for the achievable net capacity NP.

In another embodiment, an optional approximation of the number of defective printed products to be expected in a specific difficulty category of the substrate used for the printed products, in particular paper, may be determined by taking into consideration a reference number for the defective printed products in a standard difficulty category for an identical configuration of print processing machine 3. The importance of the error rate FR and the stop rate SR is made quite clear in this connection. For example, if a print substrate with a high degree of difficulty is used (e.g. a very thin or an extremely rigid type of paper, or an unusual paper format) an increase in the number of production errors should be expected. Depending on the classification of the print substrate that is used, the number of good quality printed products which meet the quality requirements of the work order and which may be produced without stopping the machine may vary, wherein this is taken into account with error rate FR. The stop rate SR factors in the varying number of errors resulting in stopping print processing machine 3. Further, the classification may also adversely affect the error rate FR and the stop rate SR.

The error rate FR and the stop rate SR may be listed as a percentage of the printed products which are produced and may relate, for example, to a reference number X of 100 printed products. With one stop for each 10000 printed products, this results in a stop rate of 0.01 percent, wherein the stop rate is 0.025 percent with one stop for each 4000 printed products. The stop rate SR may be computed based on the number of stops, divided by the number of printed products which are produced, multiplied by 100. However, the error rate FR and the stop rate SR may change even if the difficulty category for the print substrate remains the same, wherein this may be caused by erroneous machine settings for print processing machine 3 or by supplying print processing machine 3 with poor quality printed products from an upstream-arranged production and processing machine. For example, faulty printed products of this type may be caused by incorrectly configured feed units such as rods and rollers, incorrectly positioned printed products, variations in the overlay fold, sticky and/or electro-statically charged printed products and/or variations in the format.

According to one embodiment, the net capacity NP may be computed periodically during the operation of print processing machine 3 and the gross capacity BP may be adjusted correspondingly. These values may be computed several times during a work shift and, for example, once at the end of a work shift. During a shift change, values may be checked to verify whether a projected net capacity NP may still be reached with the current settings for print processing machine 3. If a projected net capacity NP (e.g., a minimum threshold) will not be reached with the current settings for print processing machine 3, the gross capacity BP and/or the number N of the devices 3*b* that restrict the gross capacity BP of print processing machine 3 may be adapted accordingly.

In another embodiment, an approximation may be realized for an expected number of defective printed products in a specific difficulty category of a print substrate for the printed products based on a reference number (X) for defective printed products in a standard difficulty category for an identical configuration of the print processing machine 3.

According to a different embodiment of the inventive method, a stop time TA is advantageously also included in the determination of the net capacity NP, in addition to the aforementioned parameters. Factored into this stop time TA may be additional parameters, for example, such as the waiting period for printed products, missing personnel, repairs, and the like. The stop time TA may refer to a time unit that represents a reference time interval (e.g., one hour). Accordingly, the net capacity NP is computed on the basis of the following formula:

$$NP=[1-(BP\cdot SR\cdot N\cdot TN)-TA]\cdot BP-(BP\cdot FR\cdot N) \quad (2)$$

For the sake of simplicity, a constant standstill time or stop time TA of 3 minutes per hour, meaning 0.05 per hour, was assumed for all variations or grades. The list shown in FIG. 2 contains an example of the average net capacity NP, which may be determined with the above-provided Formula (2), in dependence on the gross capacity BP and the number N of devices 3*b* that restrict the gross capacity BP of print processing machine 3. The left column of FIG. 2 displays the respective gross capacity BP. The remaining FIG. 2 columns contain net capacities NP which may be achieved when using different numbers N of devices 3*b* (e.g. sheet feeders for a gathering and wire-stitching machine). The limit values are marked in FIG. 2 with the aid of step-type, emphasized grades and take into consideration the error rate FR, the stop rate SR, and similar parameters determined according to the aforementioned formula. In the present case, the lower grade which is shown with the aid of limit values respectively marked by a continuous line, represents an error rate FR of 0.2 percent for each printed product and a stop rate of 0.03 percent for each printed product; the middle grade which is shown with the aid of limit values that are respectively marked with a dotted line represents an error rate of 0.15 percent for each printed product and a stop rate of 0.02 percent for each printed product; and the upper grading which is shown with the aid of limit values respectively marked with a dashed line represents an error rate of 0.05 percent for each printed product and a stop rate of 0.02 percent for each printed product. With all grades or divisions, a constant time TN for each stop of 10 seconds, meaning 0.00278 hours, was assumed for the sake of simplicity. For each grade, it is true that the net capacities NP that fall below the limit value can be safely reached with the associated gross capacity BP and the number N of devices 3*b*. The values listed above the limit value for the respective grade may not be reached with the respective configuration for the gross capacity BP and the number N of devices 3*b*, thus pointing to an uneconomical production. For example, if we view the column with 18 devices 3*b* (N=18), a net capacity NP of 8239 printed products per hour is achieved with a gross capacity BP of 11000 printed products per hour. The difference of 2761 printed products between the gross capacity BP and the net capacity NP amounts to approximately 25% of the gross capacity BP.

This net capacity is obtained as follows by replacing the aforementioned values in the formula (2):

$$NP=[1-(11000\cdot 0.03\%\cdot 18\cdot 0.00278)-0.05]\cdot 11000-(11000\cdot 0.2\%\cdot 18) \quad (2)$$

If the standstill time TA is reduced to zero, instead of 0.05 hours, the net capacity NP is computed based on the formula (1), resulting in a net capacity (NP) of 8789 printed products per hour.

Maintaining on the one hand the number N of devices 3*b* while, on the other hand, increasing the gross capacity to 17000 printed products per hour, makes it possible to achieve a net capacity NP of 11203 printed products per hour. The difference in that case already amounts to 5797 printed products or approximately 34% of the gross capacity BP. On the other hand, if the gross capacity BP should be maintained, then the number N of the devices 3*b* must be reduced. For example, if we work with a gross capacity BP of 16000 printed products per hour in the upper grade, the net capacity NP is 10048 printed products per hour. However, if lower limit values must be assumed, for example if the middle grade is applicable, then 10539 printed products per hour can still be produced even with a reduction in the number N of devices 3*b* from 21 to 19. The reduction in the number of devices 3*b* in that case results in a different layout for the printed products, with respect to the number of sheets and the page numbers. The limit values shown in FIG. 2 are based on a general target specification, which consists of reaching 80% of the gross capacity BP for the net capacity NP.

If the achievable net capacity NP is too low with regard to the actual settings for print processing machine 3, the configuration of said machine may be changed accordingly, wherein all available change options are determined and compared for this. As described with the above examples, this involves in particular a change in the number N of the devices 3*b*, the gross capacity BP, and/or the limit values.

The achievable net capacity NP for the processing of a work order can also be determined prior to the start of operations of print processing machine 3 by using, for example, the list shown in FIG. 2 and the values corresponding to the current configuration of print processing machine 3. Previously computed net capacities NP are thus available for a different number N of devices 3*b*, in combination with different gross capacities BP and with different limit values taken into consideration. Taking the example from the table and assuming a gross capacity BP of 17000 printed products per hour and a use of 18 devices 3*b*, a net capacity NP of 11203 printed products per hour could be achieved if at least the aforementioned limit values for the middle grade are observed. If the limit values are lower as a result of missing personnel and the resulting longer stop times or pauses and consequently correspond to the lower grade, the gross capacity BP must be reduced to 10000 printed products per hour when using the same number of 18 feeders, thus resulting in a production of only 7640 printed products per hour within the estimated limit values.

Conversely, a specified net capacity NP may also determine the configuration of print processing machine 3. For example, with narrow production time windows, it may be necessary to maintain a specific net capacity NP. The configuration of print processing machine 3 in that case must be selected such that it satisfies the specified net capacity NP.

As previously mentioned above, the configuration of print processing machine 3 may be analyzed for optimizing the configuration of the print processing machine 3 in dependence on the net capacity NP to be achieved as well as on the operating data acquired during the processing of previous work orders. The control method may advantageously also be used for predicting the achievable net capacity NP for print processing machine 3 according to the configuration of print processing machine 3 and the operating data acquired during the processing of previous work orders. With the aid of data acquisition module 4 and devices for recording production data (e.g., the previously achieved net capacity NP for all different types of configurations) production data may be recorded and stored as, for example as a list as shown in FIG. 2. Over a period of time an increasingly more accurate analysis, optimization and prediction may be provided, since more and more data will be available. Given a high volume of operating data for a specific configuration, values may be computed and analysis, optimization and/or prediction based on these means values may be provided.

Within the context of this application, the optimization should not only be understood to mean that the gross capacity BP or the number N of devices 3*b* may be adapted, but also that the device 1 may comprise means for adapting the aforementioned parameters directly or via different intermediary parameters in a feedback loop, thus making it unnecessary in many cases for the operating personnel to intervene.

Even though advantageous embodiments of the invention are shown and described herein, the invention is not restricted to these embodiments but may also be embodied and used differently within the scope of validity of the claims. For example, it is possible to use an interface 7 which is neither arranged directly at the location and is connected to the main control unit 2 for print processing machine 3, nor forms a component of main control unit 2. Rather, user interface 7 may be arranged at a location that is removed from print processing machine 3 and may interact via remote communication means, such as wireless or mobile communication means, with print processing machine 3. Print processing machine 3 may furthermore comprise additional modules, not mentioned explicitly herein, the parameters of which can be taken into consideration when determining the aforementioned changes in the gross capacity BP and/or the number N of devices 3*b*.

Figure 3:
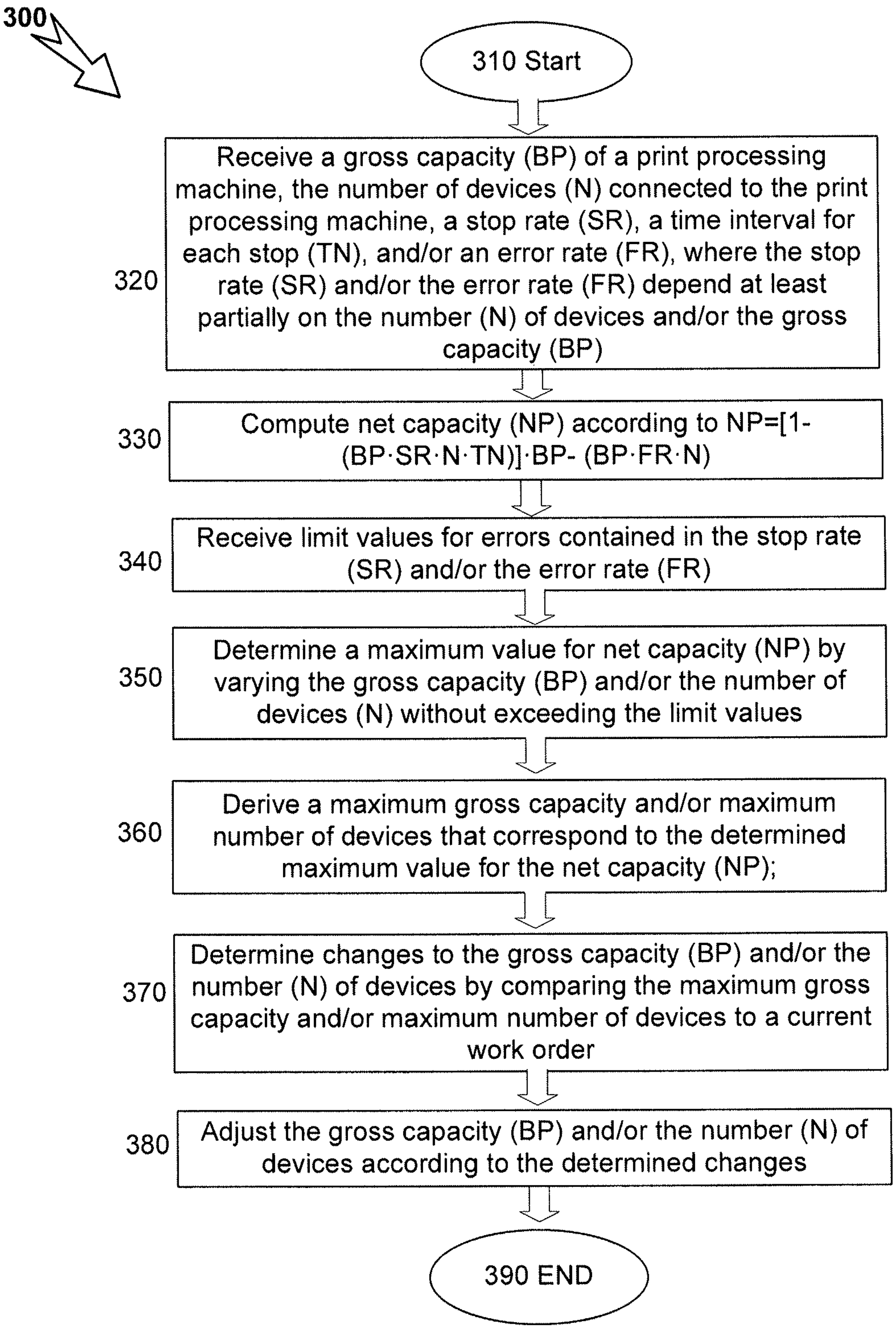
FIG. 3: An example workflow implementing an illustrative embodiment.

FIG. 3 depicts an example workflow implementing an illustrative embodiment. Flow starts in 310 and may flow to 320. In 320 the gross capacity (BP) of a print processing machine, the number of devices (N) connected to the print processing machine 3, a stop rate (SR), a time interval for each stop (TN), and/or an error rate (FR) may be received or acquired by, for example, data acquisition module 4 or user interface 7. The stop rate (SR) and/or the error rate (FR) may depend at least partially on the number (N) of devices and/or the gross capacity (BP). From 320, flow may move to 330.

In 330, the net capacity (NP) of the print processing machine may be computed by, for example, data processing module 5. The net capacity (NP) may be computed as a function of the gross capacity (BP), the number (N) of devices connected to the print processing machine 3, a stop rate (SR), a time interval for each stop (TN) and an error rate (FR) according to the following formula: $NP=[1-(BP \cdot SR \cdot N \cdot TN)] \cdot BP-(BP \cdot FR \cdot N)$. From 330, flow may move to 340.

In 340, limit values for errors contained in the stop rate (SR) and/or the error rate (FR) may be received or acquired by, for example, data acquisition module 4 or user interface 7. From 340, flow may move to 350.

In 350, a maximum value for the net capacity (NP) may be determined by, for example, data processing module 5. The maximum value for the net capacity (NP) may be determined by varying the gross capacity (BP) and/or the number (N) without exceeding the limit values. From 350, flow may move to 360.

In 360, a maximum gross capacity and/or a maximum number of devices may be derived based on the maximum value determined in 370 for the net capacity (NP). From 360, flow may move to 370.

In 370, changes to the gross capacity (BP) of print processing machine 3 and/or the number (N) of devices connected to print processing machine 3 may be determined. The changes may be determined by comparing the maximum gross capacity (determined in 360) and/or the maximum number of devices (determined in 360) to a current work order. The work order may be received by user interface 7 and/or communication interface 6. From 370, flow may move to 380.

In 380, the gross capacity (BP) and/or the number (N) of devices may be adjusted by device 1, for example, based on the changes determined in 370. From 380, flow may move to 390 and end.

Figure 4:
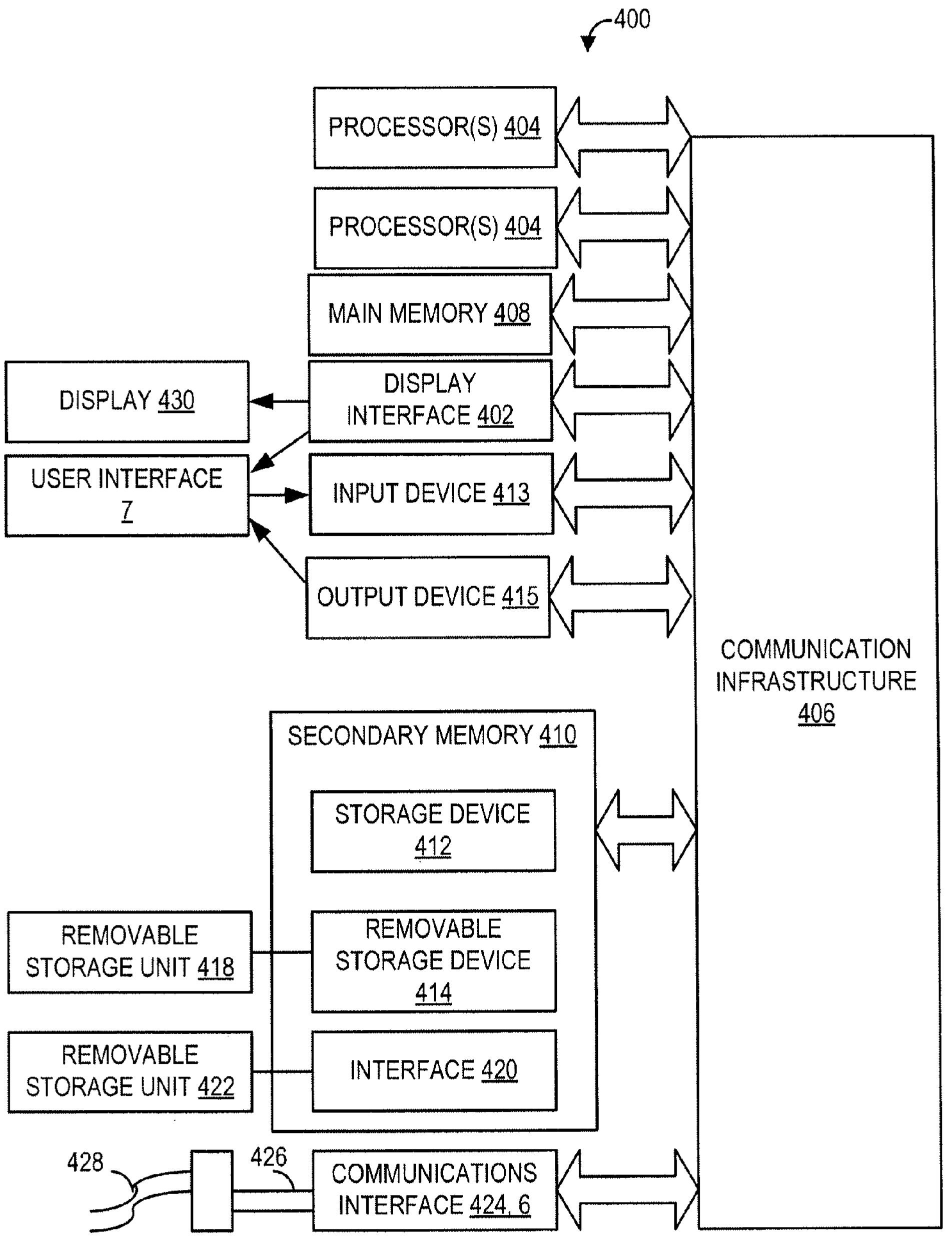
FIG. 4: An illustrative computer system that may be used in implementing an illustrative embodiment.

FIG. 4 depicts illustrative computer system 400 that may be used in implementing an illustrative embodiment of the embodiments described herein. Specifically, FIG. 4 depicts an illustrative embodiment of computer system 400 that may be used in computing devices such as, e.g., but not limited to, standalone, client, or server devices and/or the devices described in FIG. 1. FIG. 4 depicts an illustrative embodiment of a computer system 400 that may be used as client device, a server device, device 1, main control unit 2, print processing machine 3, devices 3*b*, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. Example computer system 400 is shown in FIG. 4, depicting an illustrative embodiment of a block diagram of an illustrative computer system useful for implementing the present invention. Specifically, FIG. 4 illustrates an example computer 400, which in an illustrative embodiment may be, e.g., (but not limited to) an embedded device, a Motorola Xoom tablet, an Apple iPad, a personal computer (PC) system running an operating system such as, e.g., (but not limited to) MICROSOFT® WINDOWS® NT/98/2000/XP/Vista/Windows 7/etc. available from MICROSOFT® Corporation of Redmond, Wash., U.S.A. or an Apple computer executing MAC® OS from Apple® of Cupertine, Calif., U.S.A. However, the invention is not limited to these platforms. Instead, the invention may be implemented on any appropriate computer system running any appropriate operating system. In one illustrative embodiment, the present invention may be implemented on a computer system operating as discussed herein. Other components of the invention, such as, e.g., (but not limited to) a computing device, a communications device, a telephone, a personal digital assistant (PDA), an iPhone, an IPad, a 3/4G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a device such as that shown in FIG. 4.

Computer system 400 may include one or more processors, such as, e.g., but not limited to, processor(s) 404. The processor(s) 404 may be connected to a communication infrastructure 406 (e.g., but not limited to, a communications bus, cross-over bar, interconnect, or network, etc.). Processor 404 may include any type of processor, microprocessor and/or processing logic that may interpret and execute instructions (e.g., for example, a field programmable gate array (FPGA)). Processor 404 may comprise a single device (e.g., for example, a single core) and/or a group of devices (e.g., multi-core). The processor 404 may include logic configured to execute computer-executable instructions configured to implement one or more embodiments. The instructions may reside in main memory 408 or a secondary memory 410. Processors 404 may also include multiple independent cores, such as a dual-core processor or a multi-core processor. Processors 404 may also include one or more graphics processing units (GPU) which may be in the form of a dedicated graphics card, an integrated graphics solution, and/or a hybrid graphics solution. Data processing module 5 may utilize processors 404 and memory 408, 410. Various illustrative software embodiments may be described in terms of this illustrative computer system. After reading this description, it will become apparent to a person skilled in the relevant art(s) how to implement the invention using other computer systems and/or architectures.

Computer system 400 may include a display interface 402 that may forward, e.g., but not limited to, graphics, text, and other data, etc., from the communication infrastructure 406 (or from a frame buffer, etc., not shown) for display on the display unit 430. The display until 430 may be, for example, a television, a computer monitor, or a mobile phone screen. The output may also be provided as sound through a speaker. User interface 7 may receive data from display interface 402.

The computer system 400 may also include, e.g., but is not limited to, a main memory 408, random access memory (RAM), and a secondary memory 410, etc. Main memory 408, random access memory (RAM), and a secondary memory 410, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc. Data acquisition module 4 may interface with memory 408, 410.

The secondary memory 410 may include, for example, (but is not limited to) a hard disk drive 412 and/or a removable storage drive 414, representing a floppy diskette drive, a magnetic tape drive, an optical disk drive, a compact disk drive CD-ROM, flash memory, etc. The removable storage drive 414 may, e.g., but is not limited to, read from and/or write to a removable storage unit 418 in a well-known manner. Removable storage unit 418, also called a program storage device or a computer program product, may represent, e.g., but is not limited to, a floppy disk, magnetic tape, optical disk, compact disk, etc. which may be read from and written to removable storage drive 414. As will be appreciated, the removable storage unit 418 may include a computer usable storage medium having stored therein computer software and/or data.

In alternative illustrative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

Computer 400 may also include an input device 413 may include any mechanism or combination of mechanisms that may permit information to be input into computer system 400 from, e.g., a user. Input device 413 may include logic configured to receive information for computer system 400 from, e.g. a user. Examples of input device 413 may include, e.g., but not limited to, a mouse, pen-based pointing device, or other pointing device such as a digitizer, a touch sensitive display device, and/or a keyboard or other data entry device (none of which are labeled). Other input devices 413 may include, e.g., but not limited to, a biometric input device, a video source, an audio source, a microphone, a web cam, a video camera, and/or other camera. Input device 413 may communicate with processor 404 either wired or wirelessly. Input device 413 may also include user interface 7.

Computer 400 may also include output devices 415 which may include any mechanism or combination of mechanisms that may output information from computer system 400. Output device 415 may include logic configured to output information from computer system 400. Embodiments of output device 415 may include, e.g., but not limited to, display 430, and display interface 402, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 400 may include input/output (I/O) devices such as, e.g., (but not limited to) communications interface 424, 6, cable 428 and communications path 426, etc. These devices may include, e.g., but are not limited to, a network interface card, and/or modems. Output device 415 may communicate with processor 404 either wired or wirelessly. Output device 415 may also include user interface 7, print processing machine 3, and/or devices 3*b*.

Communications interface 424, 6 may allow software and data to be transferred between computer system 400 and external devices.

In this document, the terms "computer program medium" and "computer readable medium" may be used to generally refer to media such as, e.g., but not limited to, removable storage drive 414, a hard disk installed in hard disk drive 412, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to computer system 400. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

According to another embodiment, embodiments may be represented by any of a number of well-known network architecture designs including, but not limited to, peer-to-peer, client-server, hybrid-client (e.g., thin-client), or standalone.

While various embodiments of the present invention have been described above, it should be understood that they have been presented by way of example only, and not limitation.

It will be understood that the above description of the present invention is susceptible to various modifications, changes and adaptations, and the same are intended to be comprehended within the meaning and range of equivalents of the appended claims.

What is claimed is:

1. A method for operating a print processing machine having a gross capacity (BP), a net capacity (NP), and a number (N) of devices in communication with the print processing machine, wherein the number (N) of devices restrict the gross capacity (BP) of the print processing machine, the method comprising:

computing the net capacity (NP) by a processing module, wherein the net capacity (NP) is computed as a function of the gross capacity (BP), the number (N) of devices, a stop rate (SR), a time interval for each stop (TN) and an error rate (FR) according to the following formula:

$$NP=[1-(BP\cdot SR\cdot N\cdot TN)]\cdot BP-(BP\cdot FR\cdot N),$$

wherein the stop rate (SR) and the error rate (FR) depend at least partially on the number (N) of devices or the gross capacity (BP);

receiving, by the processing module, limit values for errors contained in at least one of the stop rate (SR) or the error rate (FR);

determining, by the processing module, a maximum value for the net capacity (NP) by varying the gross capacity (BP) or the number (N) of devices without exceeding the limit values;

deriving a maximum gross capacity and maximum number of devices that correspond to the determined maximum value for the net capacity (NP);

determining, by the processing module, changes to the gross capacity (BP) or the number (N) of devices by comparing the maximum gross capacity and maximum number of devices to a current work order; and adjusting the gross capacity (BP) or the number (N) of devices according to the determined changes.

2. The method according to claim 1, further comprising:

receiving a standstill time (TA) per time unit; and wherein the method further comprises:

computing the net capacity (NP) according to the following formula:

$$NP=[1-(BP\cdot SR\cdot N\cdot TN)-TA]\cdot BP-(BP\cdot FR\cdot N).$$

3. The method according to claim 1, wherein the stop rate (SR) and the error rate (FR) are based on the number (N) of devices as well as to a reference number (X) of printed products.

4. The method according to claim 1, further comprising:

periodically computing the net capacity (NP) during the operation of the print processing machine; and adjusting the gross capacity (BP) during the operation of the print processing machine.

5. The method according to claim 1, further comprising:

determining an achievable net capacity (NP) prior to operating the print processing machine by selecting from a list containing previously computed net capacities (NP) and using a different number (N) of devices in a combination with different gross capacities (BP) and taking into consideration different limit values.

6. The method according to claim 5, further comprising:

changing a configuration of the print processing machine if the achievable net capacity (NP) does not meet a minimum threshold, wherein prior to changing the configuration of the print processing machine the number (N) of devices, the gross capacity (BP), or the limit values are determined and are compared to each other.

7. The method according to claim 1, further comprising:

realizing an approximation for an expected number of defective printed products in a specific difficulty category of a print substrate for the printed products based on a reference number (X) for defective printed products in a standard difficulty category for an identical configuration of the print processing machine.

8. The method according to claim 1, wherein the net capacity (NP) is computed separately for several work shifts.

9. The method according to claim 1, further comprising:

calculating an expected value for the time required to process a work order for a current configuration of the print processing machine.

10. The method according to claim 1, further comprising:

optimizing a configuration of the print processing machine based on a desired net capacity (NP) and operating data previously acquired during earlier work orders.

11. The method according to claim 1, further comprising:

predicting the net capacity (NP) based on a configuration of the print processing machine and operating data previously acquired during earlier work orders.

12. The method according to claim 1, further comprising:

receiving user input through a under interface, wherein user input comprises specifying an increase in the gross capacity (BP); and outputting, through the user interface, the net capacity (NP), anticipated work order completion, errors, or work order processing time.

13. An apparatus for determining and implementing changes in machine settings of a print processing machine operating with a gross capacity (BP), a net capacity (NP), and a number (N) of print devices for further processing of printed products, wherein the number (N) of devices restrict the gross capacity (BP) of the print processing machine, the apparatus comprising:

a communications interface in communication with a main control unit, wherein the main control unit communicates with the print processing machine and with the devices for further processing of printed products;

a data processing module in communication with the communications interface, the data processing module operable to perform the following:

compute the net capacity (NP) as a function of the gross capacity (BP), the number (N) of devices, a stop rate (SR), a time interval for each stop (TN) and an error rate (FR) according to the following formula:

$$NP=[1-(BP \cdot SR \cdot N \cdot TN)] \cdot BP-(BP \cdot FR \cdot N),$$

wherein the stop rate (SR) and the error rate (FR) depend on the number (N) of devices or the gross capacity (BP);

receive limit values for errors contained in the stop rate (SR), the error rate (FR), or both the stop rate (SR) and the error rate (FR);

determine a maximum value for the net capacity (NP) by varying the gross capacity (BP) or the number (N) of devices without exceeding the limit values;

derive a maximum gross capacity and maximum number of devices that correspond to the determined maximum value for the net capacity (NP);

determine changes to the gross capacity (BP) or the number (N) of devices by comparing the maximum gross capacity and maximum number of devices to a current work order; and wherein the main control unit adjusts the gross capacity (BP) of the print processing machine or the number (N) of devices according to the determined changes.

14. The apparatus according to claim 13, further comprising:

a data acquisition module, designed for acquiring and storing a configuration of the print processing machine, the net capacity (NP), a number of stops, and an associated error source for each stop.

15. The apparatus according to claim 13, wherein, the data processing module contrasts a configuration of the print processing machine and the net capacity (NP) for processing of a plurality of work orders and for characterizing an optimum configuration of the print processing machine based on a specified limit value for at least some errors contained in at least one of the stop rate (SR) and the error rate (FR).

16. The apparatus of claim 13 forming a combination with the print processing machine, wherein the print processing machine comprises a gathering and wire-stitching machine and said devices of the apparatus comprise sheet feeders that limit the gross capacity (BP) of the print processing machine.

17. The apparatus according to claim 13, further comprising:

a user interface in communication with the communications interface, the user interface operable to receive commands from a user and to output information to the user.

18. A non-transitory computer-readable medium comprising instructions, which when executed by a processor causes the processor to perform operations for operating a print processing machine having a gross capacity (BP), a net capacity (NP), and a number (N) of devices in communication with the print processing machine, wherein the number (N) of devices restrict the gross capacity (BP) of the print processing machine, the computer-readable medium comprising instructions for:

computing the net capacity (NP) as a function of the gross capacity (BP), the number (N) of devices, a stop rate (SR), a time interval for each stop (TN) and an error rate (FR) according to the following formula:

$$NP=[1-(BP \cdot SR \cdot N \cdot TN)] \cdot BP-(BP \cdot FR \cdot N),$$

wherein the stop rate (SR) and the error rate (FR) depend at least partially on the number (N) of devices or the gross capacity (BP);

receiving limit values for errors contained in the stop rate (SR), the error rate (FR), or both the stop rate (SR) and the error rate (FR);

determining a maximum value for the net capacity (NP) by varying the gross capacity (BP) or the number (N) of devices without exceeding the limit values;

deriving a maximum gross capacity and maximum number of devices that correspond to the determined maximum value for the net capacity (NP); and determining changes to the gross capacity (BP) or the number (N) of devices by comparing the maximum gross capacity and maximum number of devices to a current work order.

* * * * *